United States Patent
Wang et al.

(10) Patent No.: US 12,039,093 B2
(45) Date of Patent: Jul. 16, 2024

(54) ENCRYPTED HARD DISK DEVICE

(71) Applicant: ASUSTeK COMPUTER INC., Taipei (TW)

(72) Inventors: Cheng-Yu Wang, Taipei (TW); Shao-Kai Liu, Taipei (TW); Yu-Hsiang Huang, Taipei (TW); Bo-Hua Yang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 278 days.

(21) Appl. No.: 17/567,360

(22) Filed: Jan. 3, 2022

(65) Prior Publication Data

US 2022/0222383 A1 Jul. 14, 2022

(30) Foreign Application Priority Data

Jan. 12, 2021 (TW) ................................. 110101179

(51) Int. Cl.
| | |
|---|---|
| *G06F 21/00* | (2013.01) |
| *G06F 13/40* | (2006.01) |
| *G06F 21/35* | (2013.01) |
| *G06F 21/60* | (2013.01) |
| *G06F 21/78* | (2013.01) |

(52) U.S. Cl.
CPC .......... *G06F 21/78* (2013.01); *G06F 13/4068* (2013.01); *G06F 21/35* (2013.01); *G06F 21/602* (2013.01)

(58) Field of Classification Search
None
See application file for complete search history.

(56) References Cited

U.S. PATENT DOCUMENTS

| | | | | |
|---|---|---|---|---|
| 7,178,034 | B2 * | 2/2007 | Cihula | G06F 21/34 713/193 |
| 7,597,250 | B2 * | 10/2009 | Finn | G06K 7/10237 235/487 |
| 7,617,536 | B2 * | 11/2009 | Nonaka | G11B 20/00086 705/55 |
| 8,627,075 | B2 * | 1/2014 | Ikeda | H04W 12/50 713/168 |
| 9,058,566 | B2 | 6/2015 | Oba et al. | |
| 11,062,098 | B1 * | 7/2021 | Bergeron | H04L 9/3242 |

(Continued)

FOREIGN PATENT DOCUMENTS

| | | |
|---|---|---|
| CN | 102542462 A | 7/2012 |
| CN | 202838313 U | 3/2013 |

(Continued)

*Primary Examiner* — Maung T Lwin
(74) *Attorney, Agent, or Firm* — McClure, Qualey & Rodack, LLP

(57) ABSTRACT

An encrypted hard disk device is provided, including a near-field communication (NFC) sensing module, a processor, a storage unit, and a power switch. The NFC sensing module is configured to read a user identification (UID) of at least one sensor element. The processor is electrically connected to the NFC sensing module and the storage unit. The processor receives the UID and generates a control signal when the UID is approved. The power switch is electrically connected to the processor and the storage unit and maintains a conducting state according to the control signal and supplies power to the storage unit for accessing the storage unit.

10 Claims, 3 Drawing Sheets

(56) References Cited

U.S. PATENT DOCUMENTS

| | | | | |
|---|---|---|---|---|
| 2008/0015995 | A1* | 1/2008 | Chen | G06F 21/32 |
| | | | | 705/50 |
| 2008/0052539 | A1* | 2/2008 | MacMillan | G06F 21/78 |
| | | | | 713/193 |
| 2009/0113220 | A1* | 4/2009 | Lee | G06F 21/81 |
| | | | | 713/193 |
| 2015/0143508 | A1* | 5/2015 | Halibard | G06F 21/575 |
| | | | | 726/19 |
| 2016/0057139 | A1* | 2/2016 | McDonough | H04L 63/168 |
| | | | | 726/6 |
| 2016/0342800 | A1* | 11/2016 | Ma | G06F 21/62 |
| 2019/0318130 | A1* | 10/2019 | Ghosh | H04L 9/003 |

FOREIGN PATENT DOCUMENTS

| | | |
|---|---|---|
| CN | 108039950 A | 5/2018 |
| CN | 109359454 A | 2/2019 |
| TW | M372966 U | 1/2010 |

* cited by examiner

US 12,039,093 B2

ENCRYPTED HARD DISK DEVICE

CROSS-REFERENCE TO RELATED APPLICATION

This application claims the priority benefit of Taiwan application serial No. 110101179, filed on Jan. 12, 2021. The entirety of the above-mentioned patent application is hereby incorporated by reference herein and made a part of the specification.

BACKGROUND OF THE INVENTION

Field of the Invention

The disclosure relates to an encrypted hard disk device.

Description of the Related Art

Generally, computer users are usually highly concerned about privacy. How to encrypt data in a portable hard disk and quickly enter a password to use a file is a major challenge at present. Existing encryption methods for portable hard disks usually use built-in encryption software in an existing operation system or third-party encryption software that additionally installed to encrypt files. However, a password needs to be entered every time to encrypt a file. As a result, it is inconvenient and a password is prone to leakage.

BRIEF SUMMARY OF THE INVENTION

According to an aspect of the disclosure, an encrypted hard disk device is provided. The encrypted hard disk device includes a near-field communication (NFC) sensing module, a processor, a storage unit, and a power switch. The NFC sensing module is configured to read a user identification (UID) of at least one sensor element. The processor is electrically connected to the NFC sensing module and the storage unit to receive the UID and generate a control signal when the UID is approved. The power switch is electrically connected to the processor and the storage unit and maintains a conducting state according to the control signal and supplies power to the storage unit for accessing the storage unit.

In summary, the disclosure herein provides a sensor element of NFC to encrypt and decrypt a hard disk device, so as to effectively improve the convenience for users. In addition, a power supply of a storage unit is under controlled in the disclosure, when a UID read by the sensor element is incorrect, a processor is not allowed to read a file and power stops to supply to the storage unit, thus effectively ensures the security for users. Moreover, if a correct sensor element is not inserted, an NFC sensing module is also not allowed to read the UID, the process implements in combination with the aforementioned protection and forms a triple protection. Furthermore, the encrypted hard disk device provided herein is compatible with existing software encryption methods and avoids the risk of password leakage caused by computer virus infection since a data thief is unable to modify firmware of the processor through an operating system.

DETAILED DESCRIPTION OF THE EMBODIMENTS

Figure 1:
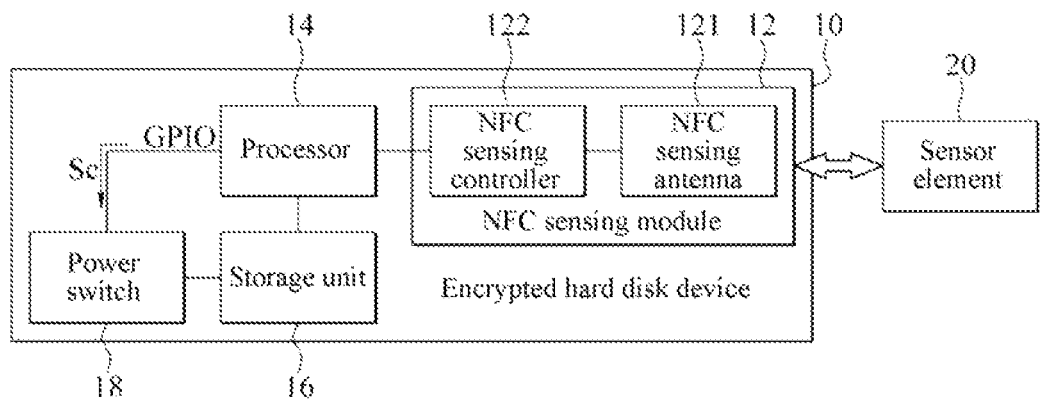
FIG. 1 is a schematic block diagram of a circuit of an encrypted hard disk device according to an embodiment of the disclosure.

Refer to FIG. 1. An encrypted hard disk device 10 includes an NFC sensing module 12, a processor 14, a storage unit 16, and a power switch 18. The NFC sensing module 12 is configured to read a built-in UID in at least one sensor element 20. In an embodiment, the sensor element 20 is a sensor key. The processor 14 is electrically connected to the NFC sensing module 12 and the storage unit 16. The processor 14 receives the UID from the NFC sensing module 12 and generates a control signal Sc when the UID is approved. The power switch 18 is electrically connected to the processor 14 and the storage unit 16, and the processor 14 is electrically connected to the power switch 18 by a General Purpose Input/Output (GPIO) interface, so as to transmit the control signal Sc to the power switch 18 through the GPIO interface. The power switch 18 maintains a conducting state according to the control signal Sc and supplies power to the storage unit 16 for accessing the storage unit 16. In an embodiment, the NFC sensing module 12 further includes an NFC sensing antenna 121 and an NFC sensing controller 122. The NFC sensing controller 122 is electrically connected to the NFC sensing antenna 121 and the processor 14, so that the NFC sensing controller 122 reads the UID of the sensor element 20 through the NFC sensing antenna 121.

In an embodiment, the storage unit 16 is a NAND flash memory or other powered memories, but the disclosure is not limited thereto.

Figure 2:
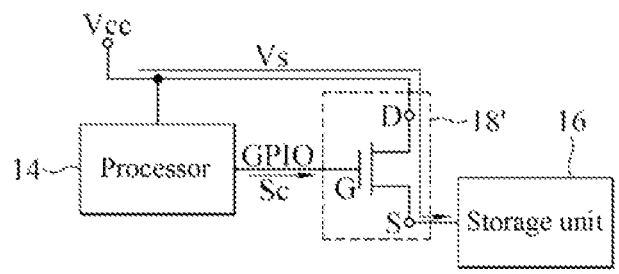
FIG. 2 is a schematic diagram of a connection state of a power switch according to an embodiment of the disclosure.
Figure 3:
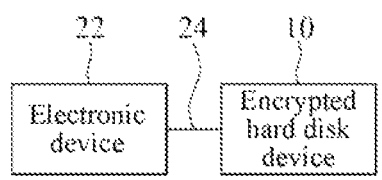
FIG. 3 is a schematic block diagram of an encrypted hard disk device connected to an electronic device according to an embodiment of the disclosure.

In an embodiment, referring to FIG. 1 and FIG. 2, the power switch 18 is a transistor switch, for example, an N-type metal oxide semiconductor (NMOS) switch 18' shown in FIG. 2. A gate G of the NMOS switch 18' is electrically connected to the processor 14 by the GPIO interface. A drain D of the NMOS switch 18' and the processor 14 are connected to a voltage terminal Vcc at the same time, and a source S of the NMOS switch 18' is electrically connected to the storage unit 16, so that the processor 14 controls the gate G to determine whether a channel between the drain D and the source S is turned on or not. When the processor 14 does not generate the control signal Sc, the gate G is not turned on, so that the channel between the drain D and the source S is not turned on, a power supply at the voltage terminal Vcc is not supplied to the storage unit 16 via the channel, and the storage unit 16 is in a power-off state in this case. When the processor 14 generates the control signal Sc, the gate G is turned on, so that the channel between the drain D and the source S is turned on, and a power supply Vs of the voltage terminal Vcc is supplied to the storage unit 16 via the channel. In an embodiment, as shown in FIG. 3, when the encrypted hard disk device 10 is to be connected to an electronic device 22, the encrypted hard disk device 10 is connected to the electronic device 22 by a connection cable 24 (such as a USB connection cable). The voltage terminal Vcc is a power supply from the electronic device 22 to supply power to the storage unit 16, so that the electronic device 22 accesses data in the storage unit 16 through the processor 14.

Referring to FIG. 1, FIG. 2, and FIG. 3, the encrypted hard disk device 10 is plugged into the electronic device 22 via the connection cable 24. When the NFC sensing module 12 senses that the sensor element 20 is in proximity, the NFC sensing controller 122 reads the built-in UID in the sensor element 20 through the NFC sensing antenna 121 and transmits the UID to the processor 14. When receiving the UID, the processor 14 determines whether the received UID is approved for reading according to a built-in UID list. When determining that the UID is not approved, the processor 14 stops operation and a user is not allowed to read the encrypted hard disk device 10. When determining that the UID is approved, the processor 14 generates the control signal Sc and transmits the control signal Sc to the power switch 18 to enable the power switch 18 to be turned on and maintained in a conducting state (that is, the channel between the drain D and the source S of the NMOS switch 18' is turned on). Therefore, the power supply Vs is provided to the storage unit 16, and the processor 14 allows the electronic device 22 to access the data in the storage unit 16. The NFC sensing module 12 continuously transmits a radio frequency signal to the sensor element 20 to ensure continuous presence of the sensor element 20. When the sensor element 20 is removed, the NFC sensing module 12 does not sense the sensor element 20, and the processor 14 stops transmitting the control signal Sc. At this point, the power switch 18 returns to an open state and is powered off (that is, the channel between the drain D and the source S of the NMOS switch 18' is not turned on), so that supply of power to the storage unit 16 is stopped and access to the storage unit 16 is prohibited.

In an embodiment, the electronic device 22 is a laptop computer or a desktop computer, but is not limited thereto.

Figure 4:
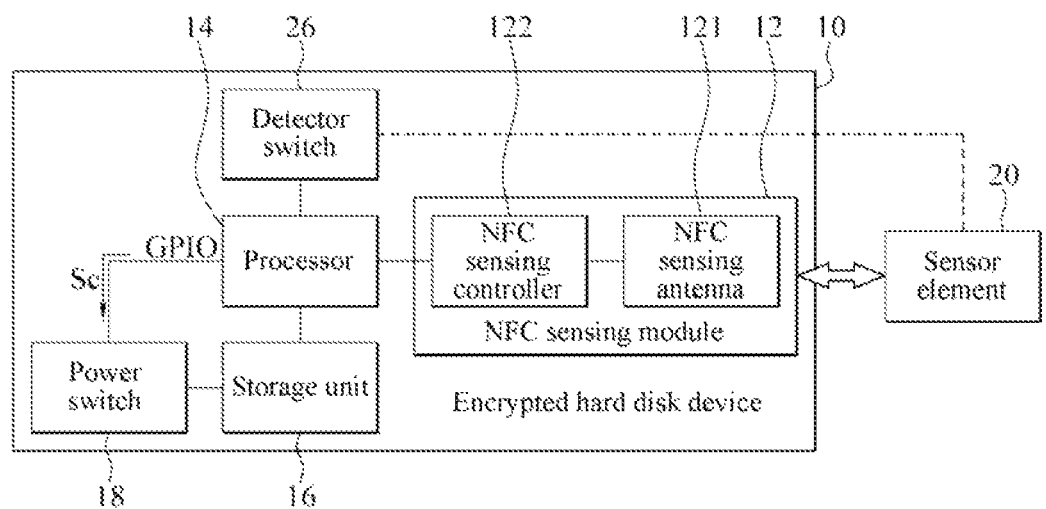
FIG. 4 is a schematic block diagram of a circuit of an encrypted hard disk device according to another embodiment of the disclosure.

Refer to FIG. 3 and FIG. 4. In addition to the NFC sensing module 12, the processor 14, the storage unit 16, and the power switch 18, the encrypted hard disk device 10 further includes a detector switch 26. The detector switch 26 is electrically connected to the processor 14 to detect whether the sensor element 20 is inserted. The detector switch 26 determines, depending on whether the sensor element 20 is inserted, whether to generate an enable signal and transmit the enable signal to the processor 14. The rest of the connection relationships and actuation thereof are the same as those in the embodiment shown in FIG. 1, and are therefore not described herein. When the sensor element 20 is not inserted, the detector switch 26 is not turned on, and the processor 14 does not receive an enable signal and therefore is not allowed to drive the NFC sensing module 12. In this case, the NFC sensing module 12 (the NFC sensing controller 122) does not read the UID of the sensor element 20. When detecting the insertion of the sensor element 20, the detector switch 26 generates an enable signal and transmits the enable signal to notify the processor 14, to enable the processor 14 to drive the NFC sensing module 12 according to the enable signal to activate a sensing function, and the NFC sensing controller 122 reads the UID of the sensor element 20 via the NFC sensing antenna 121. The NFC sensing controller 122 transmits the read UID to the processor 14. The processor 14 receives the UID from the NFC sensing module 12 and determines whether the UID is approved for access. When the UID is approved, the control signal Sc is generated to control the power switch 18, so that the power switch 18 maintains a conducting state according to the control signal Sc and supplies power to the storage unit 16, to enable the electronic device 22 to access the data in the storage unit 16.

Figure 5:
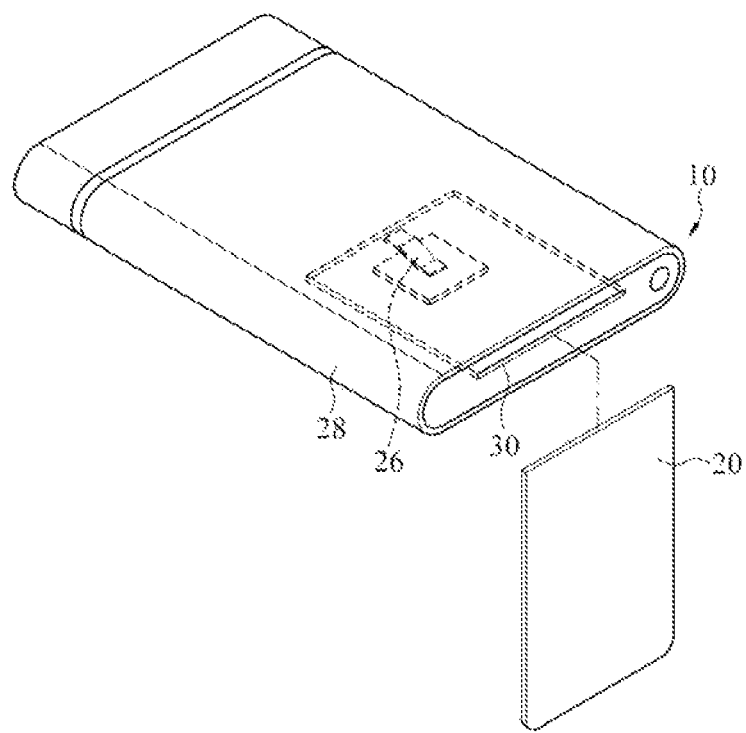
FIG. 5 is a schematic diagram of an encrypted hard disk device with a slot and a sensor element according to an embodiment of the disclosure.
Figure 6:
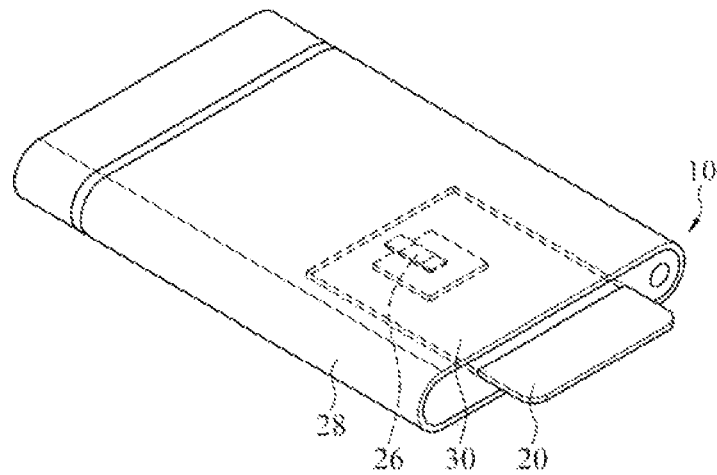
FIG. 6 is a schematic diagram of an encrypted hard disk device with a sensor element inserted according to an embodiment of the disclosure.

In an embodiment, referring to FIG. 4, FIG. 5, and FIG. 6, the encrypted hard disk device 10 further includes a case 28 for accommodating the NFC sensing module 12, the processor 14, the storage unit 16, the power switch 18, and the detector switch 26. A slot 30 is provided in the case 28 for the insertion of the sensor element 20. The detector switch 26 is disposed on an inner surface of the slot 30. The detector switch 26 determines, depending on whether the sensor element 20 is inserted, whether to activate the sensing function. Due to a mechanism-like conduction design of the detector switch 26, the detector switch 26 protrudes from the inner surface of the slot 30. When the sensor element 20 is inserted into the slot 30, the detector switch 26 is pressed and turned on, so that the detector switch 26 detects the presence of the sensor element 20, and then generates an enable signal to notify the processor 14 to enable the processor 14 to drive the NFC sensing module 12 to activate the sensing function. A shape of the slot 30 further matches a shape of the sensor element 20, for the sensor element 20 to be inserted into the slot 30 and the detector switch 26 to be turned on at the same time. In this embodiment, the slot 30 is designed as a card slot, and the corresponding sensor element 20 is designed as a card, so that the sensor element 20 is snugly inserted and accommodated in the slot 30, thereby enabling the detector switch 26 to detect the insertion of the sensor element 20. After the sensor element 20 is removed from the slot 30, the detector switch 26 is restored to an original state and the sensor element 20 is not detected. Therefore, the detector switch 26 does not generate an enable signal. In this case, the processor 14 terminates reading of the NFC sensing module 12 because the enable signal is not received. The power switch 18 returns to an open state and is powered off. In this case, access to the storage unit 16 is prohibited.

The embodiments recorded in FIG. 5 and FIG. 6 are described by using an example in which a card slot 30 matches a card sensor element 20. In other embodiments, the slot 30 and the sensor element 20 are of other shapes or forms, but the disclosure is not limited thereto. The sensor element 20 is detected by the detector switch 26 provided that a user performs an operation conveniently to snugly insert the sensor element 20 into the slot 30 for matching.

In summary, a sensor element of NFC is applied to encrypt and decrypt a hard disk device, so as to effectively improve the convenience for users. In addition, a power supply of a storage unit is under controlled, when a UID read by the sensor element is incorrect, a processor is not allowed to read a file and power stops to supply to the storage unit, thus effectively ensures the security for users. Moreover, if a correct sensor element is not inserted, an NFC sensing module is also not allowed to read the UID, the process implements in combination with the aforementioned protection and forms a triple protection.

Furthermore, the encrypted hard disk device provided herein is compatible with existing software encryption methods and avoids the risk of password leakage caused by computer virus infection since a data thief is unable to modify firmware of the processor through an operating system.

The foregoing embodiments are merely for describing the technical ideas and the characteristics of the disclosure, and are intended to enable those skilled in the art to understand and hereby implement the content of the disclosure. However, the scope of claims of the disclosure is not limited thereto. In other words, equivalent changes or modifications made according to the spirit disclosed in the disclosure shall still fall within the patent scope of the disclosure.

What is claimed is:

1. An encrypted hard disk device, comprising:
    a near-field communication (NFC) sensing module, configured to read a user identification (UID) of a sensor element through near-field communication and use the sensor element to perform encryption and decryption, wherein the NFC sensing module reads the UID responsive to the sensor element being a correct sensor element and the NFC sensing module does not read the UID responsive to the sensor element being an incorrect sensor element;
    a processor, electrically connected to the NFC sensing module to receive the UID and generate a control signal when the UID is approved;
    a storage unit, electrically connected to the processor; and
    a power switch, electrically connected to the processor and the storage unit, and maintaining a conducting state according to the control signal and supplying power to the storage unit for accessing the storage unit.

2. The encrypted hard disk device according to claim 1, wherein the NFC sensing module further comprises:
    an NFC sensing antenna; and
    an NFC sensing controller electrically connected to the NFC sensing antenna and the processor, and reading the UID of the sensor element through the NFC sensing antenna.

3. The encrypted hard disk device according to claim 1, further comprising a detector switch electrically connected to the processor to detect whether a correct sensor element is inserted and notify the processor, to enable the processor to drive the NFC sensing module to activate a sensing function when the detector switch detects that the correct sensor element is inserted, so as to read the UID, wherein the detector switch does not activate the sensing function when an incorrect sensor element is inserted.

4. The encrypted hard disk device according to claim 3, further comprising a case for accommodating the NFC sensing module, the processor, the storage unit, the power switch, and the detector switch, wherein a slot is disposed in the case for the insertion of the sensor element, and the detector switch is disposed in the slot and configured to determine whether to activate the sensing function according to the sensor element.

5. The encrypted hard disk device according to claim 4, wherein a shape of the slot matches a shape of the sensor element, for the sensor element to be inserted into the slot and the detector switch to be turned on.

6. The encrypted hard disk device according to claim 1, wherein the power switch returns to an open state and supply of power to the storage unit is stopped when the sensor element is removed.

7. The encrypted hard disk device according to claim 1, wherein the storage unit is a NAND flash memory.

8. The encrypted hard disk device according to claim 1, wherein the power switch is a transistor switch.

9. The encrypted hard disk device according to claim 8, wherein the transistor switch is an N-type metal oxide semiconductor (NMOS) switch.

10. The encrypted hard disk device according to claim 1, wherein the processor is electrically connected to the power switch by a General Purpose Input/Output (GPIO) interface.

* * * * *